US010537907B2

(12) United States Patent
Moretti

(10) Patent No.: US 10,537,907 B2
(45) Date of Patent: *Jan. 21, 2020

(54) CONTAINER OF A FLUID

(71) Applicant: LUMSON S.p.A., Capergnanica (CR) (IT)

(72) Inventor: Matteo Moretti, Crema (IT)

(73) Assignee: LUMSON S.P.A., Capergnanica (CR) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,765

(22) Filed: Jun. 5, 2018

(65) Prior Publication Data

US 2018/0353983 A1 Dec. 13, 2018

(30) Foreign Application Priority Data

Jun. 8, 2017 (IT) .......................... 102017000063177

(51) Int. Cl.
*B05B 11/00* (2006.01)
*B65D 75/58* (2006.01)
*B65B 3/04* (2006.01)
*B65B 3/02* (2006.01)

(52) U.S. Cl.
CPC .... *B05B 11/00412* (2018.08); *B65D 75/5883* (2013.01); *B05B 11/307* (2013.01); *B05B 11/3016* (2013.01); *B05B 11/3063* (2013.01); *B65B 3/02* (2013.01); *B65B 3/04* (2013.01)

(58) Field of Classification Search
CPC .......... B65D 75/5883; B05B 11/00412; B05B 11/3011; B05B 11/3016

USPC ......... 222/96, 107, 321.1, 321.7, 321.9, 566
See application file for complete search history.

(56) References Cited

U.S. PATENT DOCUMENTS

| 5,343,901 A * | 9/1994 | Meshberg | B05B 11/0037 141/2 |
| 5,873,491 A * | 2/1999 | Garcia | B05B 11/3001 222/95 |
| 6,050,451 A * | 4/2000 | Hess, III | B65D 75/5883 105/107 |
| 6,241,132 B1 * | 6/2001 | Morrison | B65D 47/10 222/541.6 |

(Continued)

FOREIGN PATENT DOCUMENTS

| FR | 2987609 A1 | 9/2013 |
| FR | 3037260 A1 | 12/2016 |

(Continued)

OTHER PUBLICATIONS

Search Report and Written Opinion dated Feb. 27, 2018 for Italian patent application No. 2017000063177.

*Primary Examiner* — Vishal Pancholi
(74) *Attorney, Agent, or Firm* — Vorys, Sater, Seymour and Pease LLP

(57) ABSTRACT

A container of a fluid including a collar having a passage and a pair of laminated film sheets heat-welded along perimetral welding lines so as to form a bag, the pair of sheets also being heat-welded to the collar so that the passage in the collar provides access to interior of the bag; the outer surface of the collar, in a zone in which the collar is welded to the pair of sheets has, seen in section, an oblong shape with two tapered ends aligned along at least one axis along which the pair of sheets are welded.

11 Claims, 5 Drawing Sheets

(56) References Cited

U.S. PATENT DOCUMENTS

| | | | |
|---|---|---|---|
| 6,273,307 B1* | 8/2001 | Gross | B65D 75/5883 |
| | | | 220/613 |
| 6,860,406 B2* | 3/2005 | Kobetsky | B29C 65/18 |
| | | | 222/92 |
| 7,201,296 B2 | 4/2007 | Graf | |
| 8,261,945 B2* | 9/2012 | Haworth | A47K 5/1208 |
| | | | 222/181.3 |
| 2004/0256414 A1* | 12/2004 | Graf | B05B 11/3016 |
| | | | 222/321.1 |
| 2005/0061831 A1* | 3/2005 | Brown | A45F 3/20 |
| | | | 222/107 |
| 2007/0047851 A1* | 3/2007 | Sato | B29C 45/14336 |
| | | | 383/104 |
| 2008/0078781 A1* | 4/2008 | Py | B65D 75/5866 |
| | | | 222/96 |
| 2008/0314475 A1* | 12/2008 | Fransen | B65D 83/62 |
| | | | 141/20 |
| 2009/0139993 A1* | 6/2009 | Last | B29C 66/242 |
| | | | 220/601 |
| 2011/0007987 A1* | 1/2011 | Davideit | B65D 83/425 |
| | | | 383/42 |
| 2014/0124532 A1* | 5/2014 | Murray | B65D 75/5883 |
| | | | 222/92 |
| 2015/0014990 A1 | 1/2015 | Bodet et al. | |
| 2017/0129680 A1 | 5/2017 | Murray | |
| 2018/0354697 A1 | 12/2018 | Moretti | |

FOREIGN PATENT DOCUMENTS

| | | | |
|---|---|---|---|
| WO | 2008030623 A2 | 3/2008 | |
| WO | 2013074953 A1 | 5/2013 | |
| WO | 2017060631 A1 | 4/2017 | |

* cited by examiner

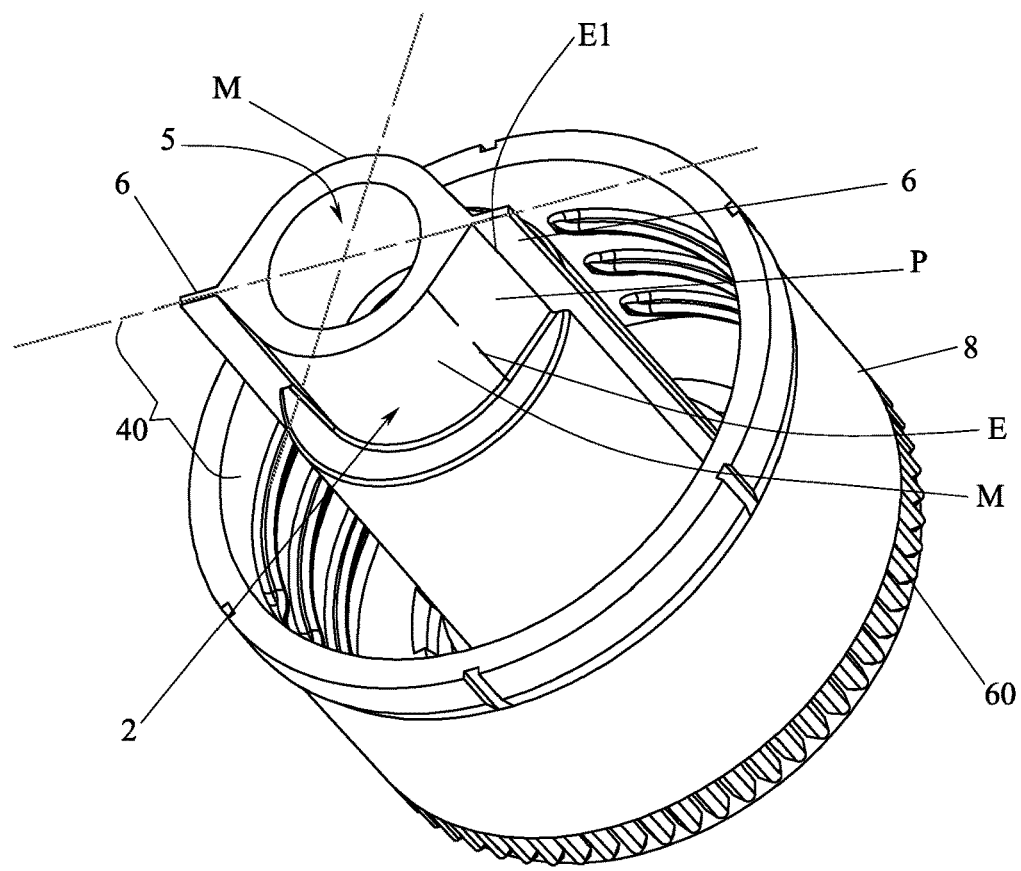
FIG.1
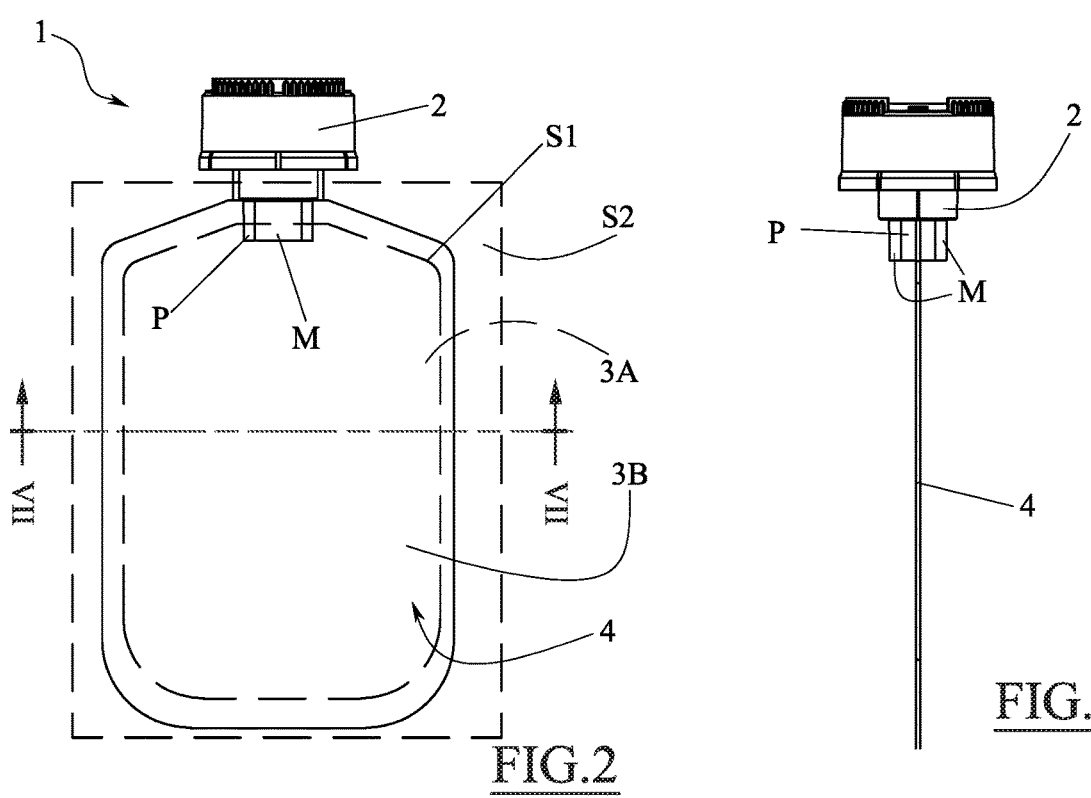
FIG.2
FIG.3

CONTAINER OF A FLUID

CROSS REFERENCE TO RELATED APPLICTION

This claims the benefit of Italian patent application no. 102017000063177,filed on Jun. 8, 2017, incorporated herein by reference in its entirety.

FIELD OF THE INVENTION

The present invention relates to a container of a fluid.

In particular, it refers to a container of the deformable bag type, produced by coupling two perimetrically welded laminated film sheets.

In particular, it refers to a container of the deformable bag type, intended to be coupled to a hermetically sealed pump of the airless type.

BACKGROUND ART

Commonly known laminated film bags, to be duly filled and subsequently fastened to a manual pump, require an essentially cylindrical collar made of a rigid material, which is secured permanently (welded) to the said bag.

The welding zone between the laminated film sheets forming the bag and the collar is particularly critical and irregularities are often created in this zone, which allow air to enter the bag, thereby contaminating the product contained therein and compromising the seal of the bag/pump system.

SUMMARY OF INVENTION

The object of the present invention is to provide a container of a fluid which is improved compared with the known art.

A further object of the invention is to provide a container which minimizes sealing problems, particularly in the welding zone between a pump coupling collar and the laminated film sheets which form the bag.

This and other objects are achieved by means of a container of a fluid produced according to the technical teachings of the claims annexed hereto.

Advantageously, the present invention allows the manual pump to be sealed to the bag effectively.

Moreover, advantageously, the present invention facilitates automation of the bag and collar welding operations.

BRIEF DESCRIPTION OF THE FIGURES

Further characteristics and advantages of the invention will become clearer in the description of a preferred but not exclusive embodiment of the container, illustrated—by way of a non-limiting example—in the drawings annexed hereto, in which:

FIG. 1 is a perspective view of a container collar according to the present invention;

FIG. 2 is a front plan view of the container according to the present invention, when empty;

FIG. 3 is a side view of the container in FIG. 2;

DETAILED DESCRIPTION OF THE INVENTION

With reference to the figures stated, reference number 1 is used to denote, as a whole, a container of a fluid.

In the present wording, the term "fluid substance" refers to a substance with a liquid or creamy consistency, which may be, for example, a cosmetic cream, a perfume, a medicine, a gel, a lacquer, a hair product, etc.

Figure 11:
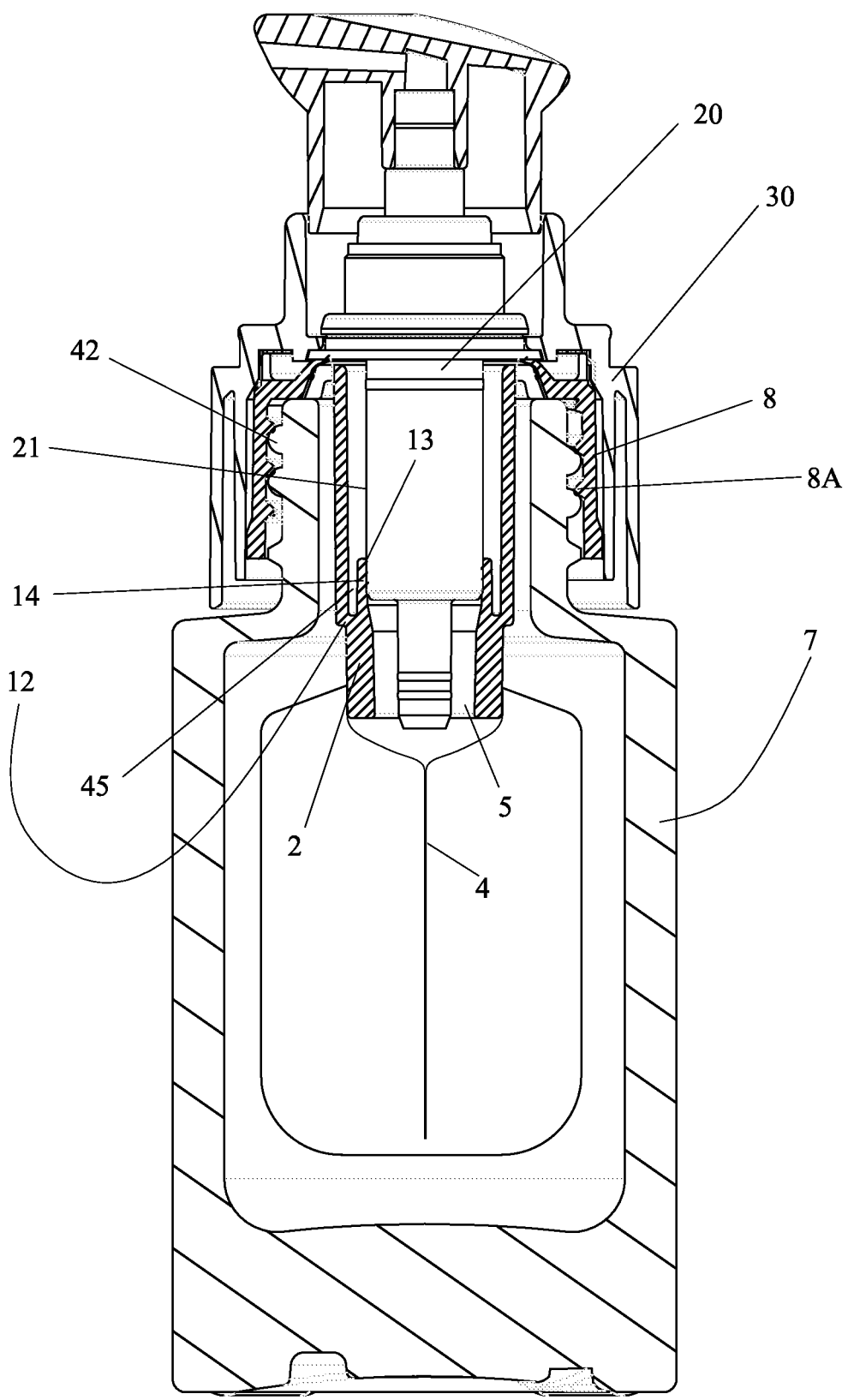
FIG. 11 is a section taken along line XI-XI of FIG. 7, when the container is housed inside an outer container and coupled to a manual dispensing pump.

The container 1 is intended, during the end use, to be housed inside an outer container 7, for example, a container made of plastic or glass, such as the container shown in the section in FIG. 11.

The container 1 comprises a collar 2 having a passage 5 (for example a cylindrical hole) and a pair 3A, 3B of laminated film sheets thermally bonded along perimetral welding lines S1 so as to form a bag 4.

The pair of sheets 3A, 3B is also thermally bonded, in a sealed manner, to the outer surface of the collar 2, so that the passage 5 in the collar 2 provides access to the bag 4, which is shown in the entirety thereof in the views in FIGS. 2 and 3.

The laminated film sheets or films may be made, for example, of the following materials: PA/AL/PE, PA/PET/PE, PE, AL/PE, PA/AL/PP, PA/PET/PP, PE/EVOH/PE, PE/EVOH/PP, PE/PA/EVOH/PE.

The sheets are thin enough to maintain a fair degree of deformability and be able to swell once the bag is filled with the fluid substance.

The collar may be made of a more rigid material than that of the laminated film sheets. In the present wording, the term 'rigid' means a material which maintains dimensional stability at room temperature, even when subjected to the normal stresses applied thereto during use of the container 1.

By way of example, materials suitable for the production of the collar 2 include: PE, HDPE, LDPE, PP, PET, PETG, PA.

Figure 4:
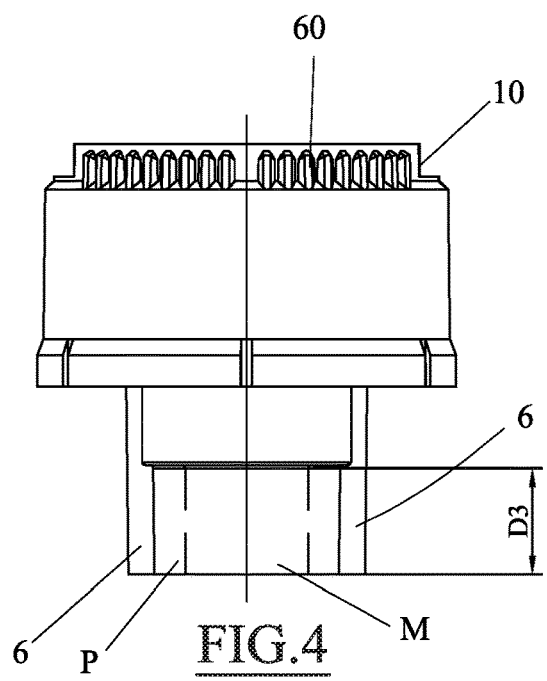
FIG. 4 is a front view of the collar in FIG. 1.
Figure 5:
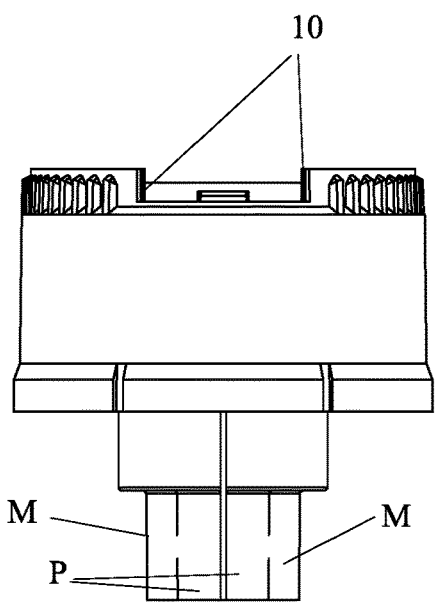
FIG. 5 is a side view of the collar in FIG. 1.
Figure 6:
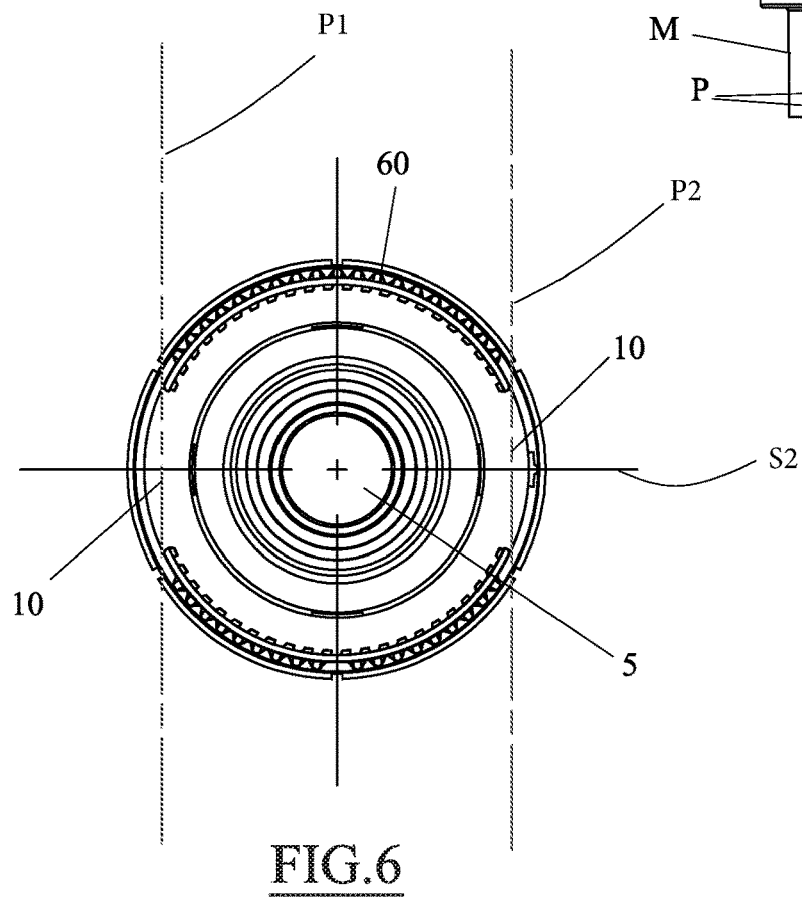
FIG. 6 is a plan view of the collar in FIG. 1.
Figure 7:
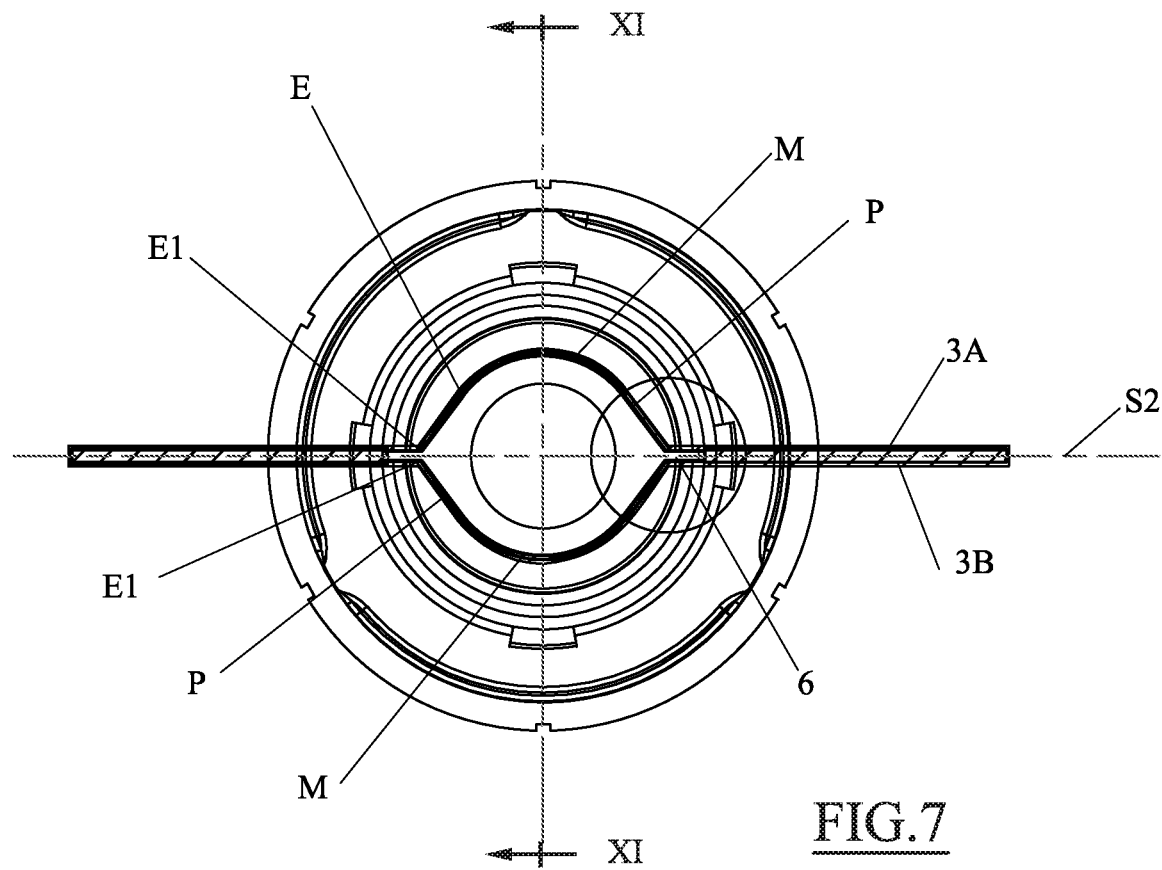
FIG. 7 is a simplified section taken along line VII-VII of FIG. 2.
Figure 8:
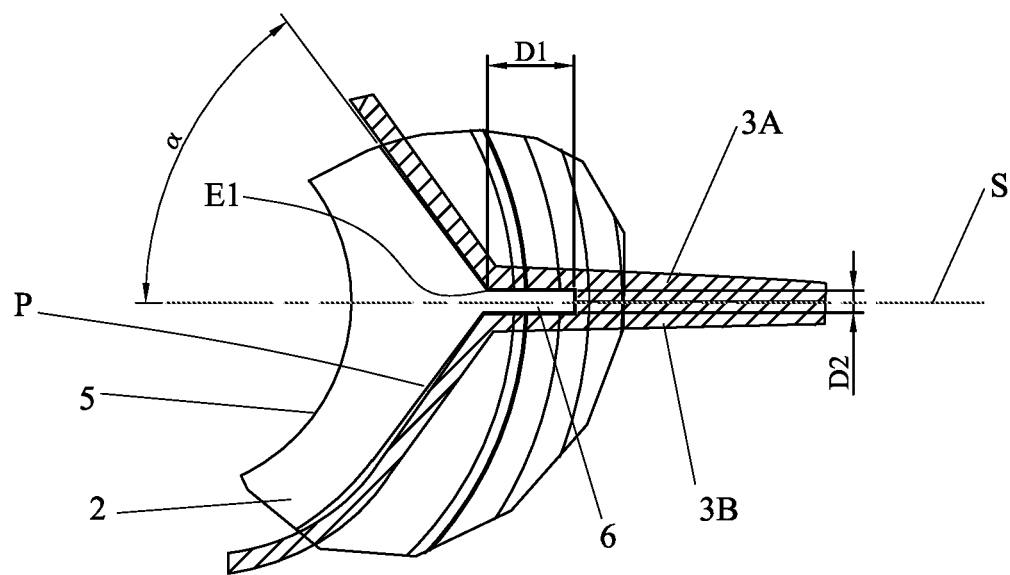
FIG. 8 is an enlarged, simplified view of the part circled in FIG. 7.

As can be seen in the sections in FIGS. 7 and 8, as well as in the perspective view in FIG. 1, the outer surface of the collar 2, in a welding zone 40 including a portion of each of the sheets 3A, 3B has, seen in section, an oblong conformation with two tapered ends aligned along at least one axis S along which the pair 3A, 3B of laminated film sheets are welded together.

The "oblong" conformation of the welding zone may also comprise a fin 6, projecting from each of the tapered ends; each fin 6 is integrally formed with the collar 2 and facilitates the interconnection of the pair 3A, 3B of laminated film sheets. Each fin may extend from the collar 2 along said axis S where the pair 3A, 3B of sheets are welded together.

As can easily be seen, the welding zone 40 on the body 2, seen in section, may be symmetrical, at least with respect to the said welding axis S, but preferably also with respect to a central axis C which is perpendicular to the axis S along which the sheets forming the bag are welded together.

In practice, a plane S2 (see FIG. 2) passes through the axis S, the two sheets 3A and 3B forming the bag being welded together along the axis S1 running along the plane S2. Only the welds sealing the bags to a part of the outer surface of the body 2 are outer to the plane.

The welding zone 40, seen in section, is formed of a first A and a second half B, which may be specular with respect to the welding axis S. Each half may feature a middle part M having the form of a circumferential arc; from each of the ends E of the circumferential arc, a preferably rectilinear segment P (endowed with an end E1 proximal to the welding axis S) may extend towards the welding axis S.

Each fin 6 may extend from the end proximal to each segment's welding axis.

Each fin 6 may have a width D2 of between 0.5 mm and 3 mm, preferably of 1 mm, and may have a length D1 of between 1 mm and 5 mm, preferably of 2 mm.

The welding zone S may have a height D3 of between 5 mm and 10 mm, preferably of 7 mm.

The inclination α (FIG. 8) of the segments P with respect to the axis S may be between 30° and 60°, preferably 45°.

In section, the form of the fin may be similar to that of a rectangle extending mainly lengthways. Such form, however, is noticeable only before the collar 2 is welded to the laminated film sheets 3A, 3B, or in sections taken along the fin in parts not concerned by the welding. Indeed, during the hot welding operation, the fin softens and deforms, becoming integral with the said welding, thereby ensuring a perfect seal (even when depressurized) of the bag formed from the sheets.

As already mentioned, the container 1 is housed in an outer container 7 during use. One possible configuration of the collar 2 features the presence of a ring nut 8 fastening the said collar to an outer container 7, in which the bag 4 may be housed.

The ring nut may feature a thread 8A which couples with a counter-thread 42 featured on a neck of the outer container 7, or other means of securing thereto, such as a snap coupling.

As an alternative to the ring nut, it is possible for the body 2 to feature a simple flange, resting on the upper end of the mouth of the outer container 7. The flange is then secured to the outer container, for example, by means of a conventional operation with a cold crimping system.

The flange may also rest on an intermediate element made of a plastic material, coupled, for example, by screwing onto the neck, and sandwiched by a pump fastening element, which is fastened to the intermediate element in a known manner.

In order to couple, in a sealed manner, the inside of the bag 4 to the hermetic manual pump 20, the collar 2 may have a cup-shaped part where the pump body may be housed. In such cup-shaped part, where the passage 5 is formed in the bottom 12, a sealing system may be present directly between the collar 2 and the pump.

For example, a sealing lip or collar 13 (integrally formed with the collar 2) may extend from the bottom 12 of the said cup-shaped part, the said sealing lip or collar being intended to cooperate in an air-tight manner with an outer surface 21 of the body of the pump 20.

The sealing lip may be positioned on a tubular element 14 (advantageously at a free end thereof) extending from the bottom 12 of the cup-shaped body and spaced apart from an inner lateral surface of the cup-like body proximal to the bottom 12 thereof, so as to form a gap 45 which insulates the lip 13, thermally and mechanically, from stresses exerted on the welding zone between the sheets 3A, 3B and the collar 2.

The presence of the tubular element 14 (which is also integrally formed with the collar 2) and the gap 45 is important. Indeed, during the operation to weld the collar 2 to the sheets 3A and 3B, the bottom of the cup (i.e. the welding zone 40) is subjected to considerable stress both from a thermal point of view (due to the welding operations) and from a mechanical point of view (a gripper is used that tightens the sheets around the collar 2).

The tubular element 14 and the gap 45 prevent the sealing lip 13 from undergoing deformation due to the mechanical and thermal stresses which would deform it and compromise the hold on the pump surface, keeping the said lip suitably spaced apart from the welding zone 40.

Figure 12:
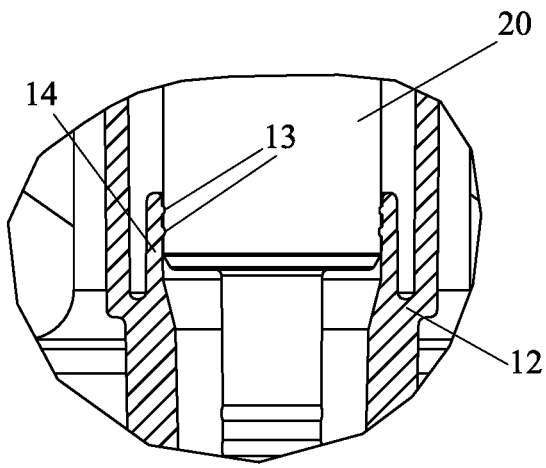
FIG. 12 is an enlargement of a part of the section in FIG. 11.

In the present embodiment, as can be seen in FIG. 12, there are two sealing lips 13 at two different diameters of the tubular element.

In order to allow automatic welding between the collar and the two sheets of laminated film, the collar 2 features at least one pair of surfaces 10 for positioning the collar 2, intended for an automatic operation to weld the sheets 3A, 3B to the collar 2.

In one possible configuration, the collar 2 comprises an end provided with a crown equipped with torsional coupling teeth with an element 30 for fastening the pump 20 to at least the collar 2. In this configuration, the pair of surfaces is made from parallel surfaces 10 (where part of the crown of teeth is not present) provided near the said end of the collar 2.

Figure 9:
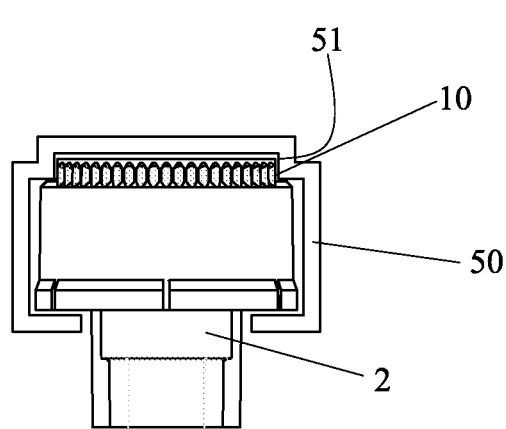
FIG. 9 is a front view of a collar engaged with a positioning guide of an automatic machine, in a prior step to an operation to weld the collar to the laminated film sheets which form the bag.

In this way, the collar 2 may be positioned prior to welding by means of a mechanical guide 50 (FIG. 9) essentially formed from a section bar featuring a narrowing 51 positioned in a zone intended to couple with the upper end of the collar.

The cooperation of the narrowing 51 with the surfaces 10 allows the oblong portion of the collar 2 to align with the welding grippers, which act on the sheets 3A and 3B and on the collar welding zone 40 (optionally provided with fins).

It should be noted that the positioning between the plane P1, P2 containing at least one of the surfaces 10 and the welding plane S2 is fixed, and in this case, the plane containing at least one of the surfaces 10 is perpendicular to the welding plane S2. Preferably, the first and the second surface 10 are contained in a respective first P1 and second plane P2, that are mutually parallel. More preferably the welding plane S2 is perpendicular to the first P1 and second plane P2.

Figure 10:
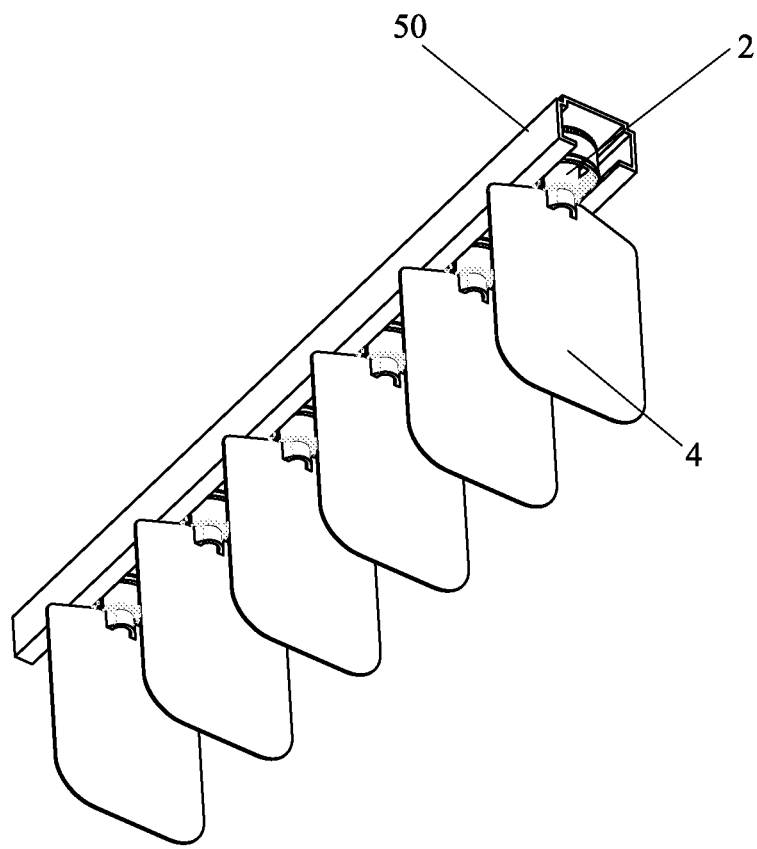
FIG. 10 shows a perspective view of a series of containers according to FIG. 2, supported by the guide in FIG. 9.

FIG. 10 shows a plurality of containers 1 already formed as a result of the welding together of the collar and sheets.

The operation envisaged in the present invention is apparent from the description above and is essentially as follows.

The container 1, advantageously produced in an automatic manner, is provided empty and with the bag 4 partially rolled so as to be inserted into the outer container 7. Once the insertion operation is complete, the collar ring nut 8 is tightened onto the outer container and the bag is filled and, through the weight of the fluid contained therein, 'opens' and deforms.

It should be noted that, between the ring nut 8 and the collar 2, there is an air passage, which allows air to flow freely into the outer container 7, externally to the bag 4.

Once the filling operations are complete, the hermetic manual pump 20 is inserted into the cup-shaped portion of the collar. The lip 13 engages, in a sealed manner, with the outer surface 21 of the body of the pump 20, thereby sealing off the interior of the bag, which is in communication with a dip tube of the pump 20. Subsequently, the fastening element 30 is placed on the pump, which engages (for example by means of pressure) with the collar 2, thereby sandwiching a flange of the pump between the collar 2 and the fastening element.

Between the collar 2 and the fastening element 30, there is a torsional coupling featured (for example, the aforesaid teeth 60, which do not therefore require alignment of the fastening element with the collar). Once the product inside the bag has been completely dispensed by the pump (and therefore the bag is very compressed, practically crushed in on itself due to the depressurization there-within), by unscrewing the fastening element, the collar, the bag, and the pump are removed contemporaneously and may therefore be easily separated from the external container 7, for efficient disposal thereof, sorted according to waste type.

Various embodiments of the innovation have been disclosed herein, but further embodiments may also be conceived using the same innovative concept.

The invention claimed is:

1. A container of a fluid, comprising:
  a collar having a passage and
  a pair of laminated film sheets thermally bonded along perimetral welding lines so as to form a bag, the pair of laminated film sheets being also thermally welded to an outer surface of the collar at a welding zone so that the passage of the collar defines an access inside the bag;
  wherein the outer surface of the collar, at the welding zone includes, in section, an oblong conformation with two tapered ends aligned along at least one welding axis where the pair of sheets are welded together;
  wherein the collar includes at least a pair of orientation surfaces to align the collar prior to an automatic welding of the sheets to the collar;
  wherein an end of the collar further comprises a crown having a plurality of parallel torsional coupling teeth for fixing an element of a pump to at least the collar; and
  wherein the pair of orientation surfaces are defines by parallel bushes that interrupt the torsional coupling teeth of the crown near said end of the collar, wherein the positioning of a plane containing the pair of orientation surfaces defined by parallel bushes is fixed with respect to the welding plane to be perpendicular to the welding plane.

2. The container according to claim 1, wherein the passage has opposed upper and lower ends, wherein the teeth lie along an upper perimeter of the collar about the upper end of the passage to all intersect a plane transverse to the welding plane.

3. The container according to claim 2, wherein the plane transverse to the welding plane which the teeth all intersect contains the the orientation surfaces perpendicular to the welding plane defined by the parallel bushes.

4. The container according to claim 1, wherein from each of the tapered ends, a fin protrudes integrally formed with the collar, the fin helping interconnection between a body of the collar and the pair of laminated film sheets, each fin extending from the collar along said welding axis where the pair of sheets are welded together.

5. The container according to claim 1, wherein the welding zone, viewed in section, is symmetrical at least with respect to said welding axis.

6. The container according to claim 5, wherein the welding zone, seen in section, is formed by a first half and a second half specular with respect to the welding axis, each half having a middle part shaped as a circumferential arc, from each end of the circumferential arc extending towards said welding axis a straight segment having an end proximal to the welding axis.

7. The container according to claim 6, wherein the fin extends from the end proximal to the welding axis of each of the segments.

8. The container according to claim 1, wherein the collar comprises a fastening ring nut to an outer container in which the bag may be inserted.

9. The container according to claim 1, wherein the collar has a cup-shaped part in which said passage is formed, a sealing lip extending by a bottom of said cup-shaped part, the sealing lip being integrally formed with the collar, the sealing lip cooperating in an air-tight manner with an outer surface of the pump body of an airless pump at least partially housed in the collar.

10. The container according to claim 9, wherein the sealing lip is positioned on the inner surface a tubular element extending from the bottom of the cup-shaped body, the lip being spaced from an inner lateral surface of the cup shaped body near its bottom, the tubular element being disposed so as to form a cavity which isolates the lip thermally and mechanically from the forces applied to the welding zone during the welding between the collar and the sheets.

11. The container according to claim 1, wherein each torsional coupling tooth is on a perimeter at the end of the collar.

* * * * *